3,772,404
RESINS
Michael Horace Knight, Barbara Mitchell, and Maurice James Ratcliffe, Runcorn, England, assignors to Imperial Chemical Industries Limited, London, England
No Drawing. Filed Jan. 3, 1972, Ser. No. 215,103
Claims priority, application Great Britain, Jan. 8, 1971, 1,061/71
Int. Cl. C08f 29/20
U.S. Cl. 260—859 R                   13 Claims

ABSTRACT OF THE DISCLOSURE

A polymerisable mixture, and resins derived by copolymerisation of the mixture, comprising from 5% to 95% by weight of at least one prepolymer having the structure:

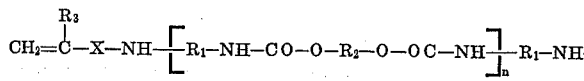

in which $R_1$ and $R_2$ are each organic groups at least one of which contains at least one cyclic group in the macromolecular chain of the prepolymer and are such that in said structure there are not more than 30 atoms, and preferably not more than 20 atoms, in the chain between adjacent cyclic groups, $n$ is a whole number of from 1 to 20, and preferably 1 to 10, and when $n$ is one and only $R_2$ contains at least one cyclic group in the chain there are not more than 30 atoms, and preferably not more than 20 atoms, in the chain between the cyclic group in $R_2$ and the nitrogen atom attached to the group X, $R_3$ is hydrogen or a hydrocarbyl group and X is a divalent group, and from 95% to 5% by weight of at least one vinyl monomer substantially free of isocyanate-reactive groups and copolymerisable with said prepolymer.

---

This invention relates to a copolymerisable mixture, to resins derived by copolymerisation of said mixture, and to fibre-reinforced articles of said resin.

It has been proposed to prepare resins by copolymerisation of a vinyl monomer with the product of reaction of a polyisocyanate and a vinyl monomer reactive with isocyanate. It has also been proposed to prepare resins by copolymerisation of a vinyl monomer with the product of reaction of an isocyanate-ended prepolymer and a vinyl monomer reactive with isocyanate, that is, by copolymerisation of a vinyl monomer with a vinyl-ended prepolymer.

The resins which have been proposed hitherto have suffered from the disadvantage that where some properties of the resins may be high and acceptable for some applications other properties may be unacceptably low for some applications. For example, in the case where the impact strengths of the resins are high the thermal properties of the resins may be unacceptably low, and conversely, where the thermal properties of the resins are high the impact strengths of the resins may be unacceptably low.

We have now found that by careful selection of the structural features of the isocyanate-ended propolymer from which the vinyl-ended prepolymer is produced resins having a good combination of properties may be produced by copolymerisation of a vinyl monomer with a vinyl-ended prepolymer, and in particular resins having a good combination of impact strength and thermal properties may be produced. The resins may also have good resistance to corrosion by a variety of chemicals, e.g. aviation fuels, oils, water, including boiling water, dilute acids and dilute alkalis.

Furthermore, the mixture of vinyl monomer and the vinyl-ended prepolymer from which the resin may be produced may be stored, often for a period of many months, without an undesirable amount of copolymerisation taking place. The mixture may also be used to impregnate fibrous reinforcing materials and the thus formed prepregs may, if desired, be stored before forming into fibre reinforced shaped articles.

According to the present invention there is provided a polymerisable mixture comprising from 5% to 95% by weight of at least one prepolymer having the structure:

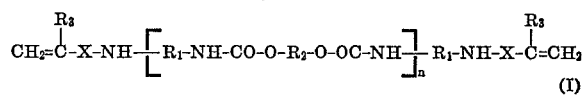

in which $R_1$ and $R_2$ are each organic groups at least one of which contains at least one cyclic group in the macromolecular chain of the prepolymer and are such that in said structure there are not more than 30 atoms in the chain between adjacent cyclic groups, $n$ is a whole number of from 1 to 20, and when $n$ is one and only $R_2$ contains at least one cyclic group in the chain there are not more than 30 atoms in the chain between the cyclic group in $R_2$ and the nitrogen atom attached to the group X, $R_3$ is hydrogen or a hydrocarbyl group and X is a divalent group, and from 95% to 5% by weight of at least one vinyl monomer substantially free of isocyanate-reactive groups and copolymerisable with said prepolymer.

The prepolymer having the structure I will hereinafter be referred to as the vinyl-ended prepolymer.

By vinyl monomer we mean a monomer containing at least one ethylenically unsaturated terminal group.

By atoms in the chain we mean atoms forming the chain and excluding atoms or groups pendent from the chain.

The vinyl-ended prepolymer and the vinyl monomer copolymerisable therewith should be miscible so as to form a liquid solution at the temperature at which copolymerisation and shaping of the mixture to produce the resin is effected. It is preferred, for reasons of ease of handling and storage stability that the vinyl-ended prepolymer and the vinyl monomer copolymerisable therewith form a miscible liquid solution at ambient temperature. If the mixture of vinyl-ended prepolymer and vinyl monomer copolymerisable therewith are not miscible, even at the temperature at which copolymerisation and shaping is effected, the properties of the resins produced therefrom may not be as satisfactory as would have been the case if the mixture had been miscible.

The vinyl-ended prepolymer may be prepared by reaction of a vinyl monomer containing an isocyanate-reactive group with an isocyanate-ended prepolymer having the structure:

OCN⁻[R₁—NH—CO—O—R₂— 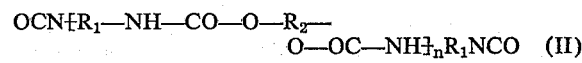 O—OC—NH]ₙR₁NCO    (II)

where $R_1$, $R_2$ and $n$ have the designations as hereinbefore described. The prepolymer having the structure II will hereinafter be referred to as the isocyanate-ended prepolymer.

The isocyanate-ended prepolymer may be prepared in conventional manner by reaction of a diol, or mixture of diols, having the structure HO—$R_2$—OH with a diisocyanate, or mixture of diisocyanates, having the structure OCN—$R_1$—NCO. In order that the prepolymer having the structure II may have isocyanate end-groups it will be appreciated that a molar excess of the diisocyanate over the diol must be used in the preparation of the prepolymer, the value of $n$ in the prepolymer depending on the molar proportion of diisocyanate to diol used, the value of $n$ decreasing as this latter ratio increases.

Formation of the isocyanate-ended prepolymer may be assisted by the use of catalysts known in the art to assist polyurethane formation, for example, tertiary amines, and metal salts, e.g. stannous octoate and in particular dibutyl tin dilaurate.

The reaction of the diol and diisocyanate may produce a viscous isocyanate-ended prepolymer and, especially where $n$ is a large number, the prepolymer may be solid, and thus it is desirable that the reaction of the diol and the diisocyanate be effected in the presence of an inert diluent. Similarly, where the isocyanate-ended prepolymer is very viscous or solid reaction of the said prepolymer with a vinyl monomer containing an isocyanate-reactive group may desirably be effected in the presence of an inert diluent. The diluent should be substantially free of groups which are reactive with isocyanate groups, at least to such an extent that the diluent does not interfere with the formation of the prepolymers.

Where the vinyl-ended prepolymer having the structure I is prepared in an inert diluent, the prepolymer may be separated from the diluent and dissolved in the vinyl monomer with which it is to be copolymerised.

However, as the vinyl monomer with which the vinyl-ended prepolymer is to be copolymerised is itself substantially free of groups reactive with isocyanate groups the prepolymer formation reactions may suitably be effected in solution in the said vinyl monomer. Thus, in this case it will be unnecessary to isolate the vinyl-ended prepolymer before dissolving the prepolymer in the vinyl monomer with which it is to be copolymerised, and the mixture of the vinyl-ended prepolymer in the latter vinyl monomer may be suitable for use directly in copolymerisation to produce the resin. Where the prepolymer formation reactions are to be effected in the presence of the vinyl monomer with which the vinyl-ended prepolymer is to be copolymerised and the prepolymer formation reactions involve heating of the diol and diisocyanate undesirable premature polymerisation of the vinyl monomer may be prevented by the use of suitable inhibitors, e.g. quinones and tertiary butyl catechol. Inhibitors may also be useful where the mixture of vinyl-ended prepolymer and vinyl monomer copolymerisable therewith is to be stored before use.

Although the vinyl monomer copolymerisable with the vinyl-ended prepolymer should be substantially free of isocyanate-reactive groups we do not exclude the possibility of using in the mixture up to 5% or even 10% of a vinyl monomer containing isocyanate-reactive groups by weight of the total vinyl monomer in the mixture. In this case, of course, the reaction of the diol with the diisocyanate should not be effected in solution in the vinyl monomer otherwise undesirable side reactions may take place.

The use of a small amount, e.g. up to 10% by weight, of a vinyl monomer containing isocyanate reactive groups, especially where the latter vinyl monomer is a polar vinyl monomer, may lead to improvements in the clarity of the mixture. A suitable monomer of the isocyanate-reactive type is acrylic acid or methacrylic acid.

As hereinbefore described, the vinyl-ended prepolymer should be miscible with the vinyl monomer or mixture thereof with which it is to be copolymerised so as to form a liquid solution, at least at the temperature at which the copolymerisation is to be effected. The solubility is governed by the nature and molecular weight of the vinyl-ended prepolymer and by the nature of the vinyl monomer or mixture thereof with which it is to be copolymerised and also by their relative proportions. Suitable combinations of vinyl-ended prepolymer and vinyl monomer with which it is to be copolymerised should be chosen to give the desired miscibility.

In particular the diols and the diisocyanates and the relative proportions thereof used in the preparation of the isocyanate-ended prepolymer should be chosen such that the resultant vinyl-ended prepolymer prepared therefrom is miscible with the vinyl monomer or mixture thereof with which it is to be copolymerised at least at the temperature at which the copolymerisation is to be effected.

The value of $n$ in the vinyl-ended prepolymer has a bearing on the miscibility and as $n$ increases it will generally be more difficult to mix the vinyl-ended prepolymer in a given proportion of vinyl monomer or mixture thereof. For this reason the value of $n$ in the vinyl-ended prepolymer is preferably not greater than 10 and is more preferably not greater than 5, that is, the molar ratio of isocyanate groups in the diisocyanate or mixture thereof to hydroxyl groups in the diol or mixture thereof from which the isocyanate-ended prepolymer is produced is preferably 1.1:1 or greater, and more preferably 1.2:1 or greater.

Most suitably, the value of $n$ in the vinyl-ended prepolymer is not greater than 3, that is, the molar ratio of isocyanate groups in the diisocyanate or mixture thereof to hydroxyl groups in the diol or mixture thereof from which the isocyanate-ended prepolymer is produced is suitably 1.33:1 or greater.

Furthermore, in order to aid miscibility, it is preferred that the diol and diisocyanate from which the isocyanate-ended prepolymer is produced are chosen so as to produce an amorphous prepolymer following criteria which are well known in the art. For example, one or both of the groups $R_1$ and $R_2$ in the prepolymer contain cyclic groups and it will generally be found that where the cyclic group is linked in a meta configuration in the chain a more amorphous prepolymer will be produced than in the case where the cyclic group is linked in a para configuration, although this is not essential.

The use of mixtures of diols and diisocyanates may also result in the production of an amorphous prepolymer. Also, where the diol and/or the diisocyanate contain an alkylene chain it will generally be found that pendent substituent groups on the chain will lead to the production of more amorphous prepolymers than is the case where such pendent substituent groups are absent. The vinyl-ended prepolymers are generally more miscible the more polar is the vinyl monomer with which it is to be copolymerised.

Copolymerisation of the vinyl-ended prepolymer with the vinyl monomer or mixture thereof may be effected in the presence of a suitable catalyst, for example, a free-radical generator, e.g. a peroxide. Application of heat may assist the copolymerisation although it may be possible, by suitable choice of catalysts and accelerators, to effect the copolymerisation at or near ambient temperature. The catalyst may be activatable by visible light or ultraviolet light or a mixture thereof, e.g. sunlight. Suitable light activatable catalysts include, for example, benzoin and benzoin alkyl ethers.

Suitable free radical generators include, for example, benzoyl peroxide, tertiary butyl peroctoate, ditertiary butyl peroxide, lauryl peroxide and methyl ethyl ketone peroxide.

The catalyst may also be a combination of an accelerator and a promotor. Suitable accelerators include, for example, cobalt complexes, e.g. cobalt octoate and naphthanate, and suitable promotors include, for example, tertiary amines, e.g. dimethyl aniline.

The catalyst may suitably be present in a proportion of 0.01 to 2%, or even 5%, by weight of the mixture although concentrations outside this range may be used if desired.

The temperature at which the copolymerisation is effected will be dependent on the nature of the catalyst and/or temperature at which the mixture forms a miscible liquid composition. Where the mixture is liquid at ambient temperature it is possible, by suitable choice of catalyst, to effect the copolymerisation at or near ambient temperature although, where speedy copolymerisation is desirable, the mixture will generally be copolymerised in a temperature range of 50° C. to 200° C., preferably 100° C. to 175° C.

Shaping of the mixture may be effected on conventional equipment for shaping of thermosetting resins, e.g. by shaping in a mould with or without the application of pressure. The shaping should be completed before the resin becomes intractable. Where the mixture of the vinyl-ended prepolymer in a vinyl monomer or mixture thereof is of suitable viscosity, either before copolymerisation has commenced or after copolyerisation has been partially completed, the mixture may be shaped by injection moulding or extrusion and the copolymerisation subsequently completed.

In a further embodiment of our invention we provide a resin formed by copolymerisation of a mixture of from 5% to 95% by weight of at least one vinyl-ended prepolymer as herein described and from 95% to 5% by weight of at least one vinyl monomer as herein described and copolymerisable therewith.

The properties of the resins of our invention will depend on the nature of the vinyl-ended prepolymer, on the nature of the vinyl monomer or mixture thereof copolymerised with the said prepolymer, and on the relative proportions of the vinyl-ended prepolymer and the vinyl monomer in the mixture. In particular the properties will be governed by the nature of the groups $R_1$ and $R_2$, the value of $n$ and by the number of atoms between adjacent cyclic groups in the vinyl-ended prepolymer macromolecular chains.

Thus, we have found that the softening point of the resins of our invention generally decreases with increase in the number of atoms between adjacent cyclic groups in the vinyl-ended prepolymer. On the other hand, the impact strength of the resins generally increase with increase in the number of atoms between adjacent cyclic groups. Where it is desired to produce a resin having a particularly good combination of softening point and impact strength it is preferred to choose the nature of the diol or mixture thereof and the nature of the diisocyanate or mixture thereof from which the isocyanate-ended prepolymer, and thus the vinyl-ended prepolymer, is produced to give in said prepolymer not more than 20, and more preferably not more than 12 or even 9 atoms between adjacent cyclic groups in the prepolymer chains, and, where $n$ is one and only $R_2$ contains at least one cyclic group in the chain it is preferred that there are not more than 20 atoms, more preferably not more than 12 or even 9 atoms, in the chain between the cyclic group in $R_2$ and the nitrogen atom attached to the group X.

The nature of the diol, or mixture thereof, and the nature of the diisocyanate, or mixture thereof, should be chosen to give the desired number of atoms between adjacent cyclic groups in the macromolecular chains of the vinyl-ended prepolymer.

It will be noted that the vinyl-ended prepolymer of structure I contains urethane linkages in the macromolecular chains and we have also found in resins prepared from a mixture of vinyl monomer and vinyl-ended prepolymer having a given proportion of cyclic groups to non-cyclic hydrocarbyl units in the prepolymer that the softening points of the resins are higher the greater is the number of urethane linkages in the prepolymer.

Similar considerations apply to the selection of the value of $n$ in the prepolymer of structure I. As $n$ increases, that is, as the molecular weight of the vinyl-ended prepolymer increases, the impact strength of the resin will generally increase and the softening point of the resin will generally decrease. For a good combination of properties $n$ is preferably not greater than 10. The proportions of the diol or mixture thereof to the diisocyanate or mixture thereof should be chosen to give in the isocyanate-ended prepolymer the desired value of $n$. Thus as $n$ is at least 1, the ratio of diisocyanate to diol should be not greater than 2:1. Ratios greater than this may be used, if desired, although this may be wasteful of diisocyanate and may thus be economically undesirable and in any case may lead to the production of products having low impact strength. Where it is desired to produce an isocyanate-ended prepolymer having a value of $n$ of 10, the ratio of diisocyanate to diol should be about 1.1:1.

The impact strengths and softening points of the resins are also governed by the nature of the groups $R_1$ and $R_2$ in the vinyl-ended prepolymer. In general, where both $R_1$ and $R_2$ have cyclic groups in the chains and where the nitrogen of the isocyanate group and the oxygen of the hydroxyl group are attached directly to a cyclic group the softening points of the resins will be higher and the impact strengths lower than when one only of the groups $R_1$ and $R_2$ contains such a cyclic group in the cahin.

In the case where either or both of the groups $R_1$ and $R_2$ contain in the chain both a cyclic group and atoms not forming part of a cyclic group then in general the greater the number of such atoms in the chain not forming part of a cyclic group the greater will be the impact strength and the lower will be the softening point.

Generally, the softening points of the resin increase with increase in the proportion of the vinyl-ended prepolymer in the mixture from which the resin is produced and it is preferred where a good combination of properties, and in particular where a high softening point resin is desired, that the resin be derived by copolymerisation of a mixture of vinyl-ended prepolymer and vinyl monomer or mixture thereof comprising from 80% to 20% by weight, more preferably 60% to 40% by weight, of vinyl-ended prepolymer to 20% to 80% by weight, more preferably 40% to 60% by weight, of vinyl monomer copolymerisable therewith.

The nature of the groups $R_1$ in the diisocyanate and $R_2$ in the diol must be such that at least one of the groups contains at least one cyclic group in the chain. Moreover, in the vinyl-ended prepolymer there must not be more than 30 atoms, and preferably not more than 20 atoms between adjacent cyclic groups in the macro-molecular chains. It will be appreciated that if one only of the groups $R_1$ and $R_2$ contains a cyclic group in the chain even if that cyclic group is attached directly to the nitrogen atom of an isocyanate or to an oxygen atom of a hydroxyl group, as the case may be, the other of the groups $R_1$ and $R_2$ may not contain more than 24 atoms, preferably not more than 14 atoms in the chain.

The cyclic groups in the groups $R_1$ and/or $R_2$ may be, for example, cycloaliphatic groups or aromatic groups, e.g. cycloalkylene groups or groups containing one or more benzene rings, or substituted derivatives thereof wherein one or more of the hydrogen atoms on the ring carbon atoms have been replaced by groups which are unreactive towards hydroxyl and isocyanate groups, e.g. halogen atoms, monovalent hydrocarbyl groups, monovalent oxyhydrocarbyl groups and halogen substituted derivatives of these groups.

Examples of diols containing cyclic groups which may be used in the preparation of the isocyanate-ended prepolymer include, for example, cycloalkane diols, e.g. 1:3- and 1:4-cyclohexane diol and a diol having the structure

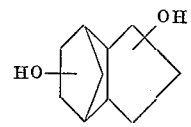

in which case the group $R_2$ in the vinyl-ended prepolymer has the structure

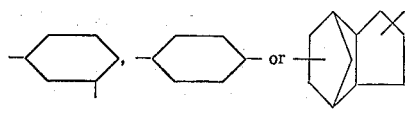

respectively. Other suitable diols include, for example, cycloalkane dialkanols, e.g. cyclohexane dimethanol or cyclohexane diethanol; polycycloalkane diols, polycycloalkane dialkanols, aryl dialkanols and condensates of alkylene oxides with aromatic compounds containing two phenolic groups.

Particularly preferred diols on account of the desirable properties of the resins derived therefrom are diols of the structure

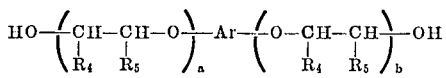

that is, oxyalkylated derivatives of phenolic compounds, where $R_4$ and $R_5$ are hydrogen atoms or alkyl groups, e.g. methyl, and Ar is a divalent aromatic group in which each free valency is on an aromatic carbon atom, and in which $a+b$ together preferably total not more than 8 and $a$ is preferably not greater than $b+3$.

In this case the unit $R_2$ has the structure:

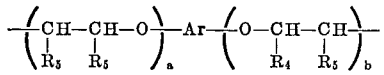

Ar may be mononuclear, e.g. as in phenylene, fused polynuclear as in naphthalene or anthracene, or preferably has the structure

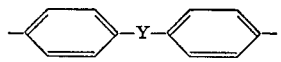

in which Y is a divalent link, e.g. —O—, —SO$_2$—, —CO— or —CH$_2$ or substituted derivative of —CH$_2$ e.g.

Suitably, one of the groups $R_4$ and $R_5$ is hydrogen and the other is methyl, or both $R_4$ and $R_5$ are hydrogen, that is, the diol may be prepared by reaction of propylene oxide or ethylene oxide with a phenolic compound having the structure HO—Ar—OH, preferably

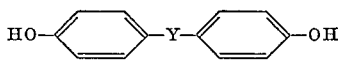

Preferably $a$ plus $b$ is not greater than 4.

Examples of diols which do not have cyclic groups in the chain between the free valencies include, for example, ethylene glycol and propylene glycol, in which case $R_2$ has the structure

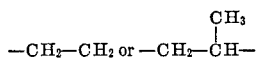

butylene glycol, diethylene glycol and derivatives thereof in which one or more of the carbon atoms are substituted by atoms or groups which are unreactive towards hydroxyl and isocyanate groups.

Diisocyanates containing cyclic groups which may be used to prepare the isocyanate-ended urethane prepolymer include, for example, diisocyanates in which the chain between the free valencies is provided with at least one aromatic group or at least one cycloaliphatic group, or in which the chain between the free valencies includes in combination at least one aromatic and at least one cycloaliphatic group.

Cycloaliphatic diisocyanates include for example, diisocyanates of the structure:

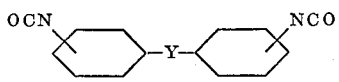

where —Y— is a divalent link which may be, for example, —CH$_2$—, —O—, —SO$_2$—, —CO—, and the isocyanate groups are linked meta or para to the groups Y. A particular example is 4:4'-dicyclohexylmethane diisocyanate.

On account of the properties of the resins derived therefrom aromatic diisocyanates are preferred, for example 2:4- or 2:6-tolylene diisocyanates, or mixtures thereof, in which case the group $R_1$ in the vinyl-ended prepolymer has the structure

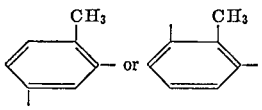

or a combination of said structures. Another suitable aromatic diisocyanate is that having the structure

where $m$ is a whole number chosen such that there are not more than 30 atoms between cyclic groups in the vinyl-ended prepolymer derived therefrom. A suitable diisocyanate having the latter structure is xylylene diisocyanate.

A particularly suitable diisocyanate is that having the structure:

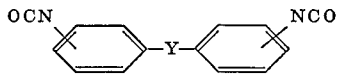

where Y is a divalent link which may have the designations hereinbefore described and in which the isocyanate groups are linked meta or para to the group Y. A preferred example is 4:4'-diisocyanato diphenyl methane where a good combination of high softening point and high impact strength is desired in the resins derived therefrom.

Diisocyanates which do not contain cyclic groups may be used in the production of the isocyanate-ended prepolymer. Suitable such diisocyanates include, for example, tetramethylene diisocyanate, pentamethylene diisocyanate and hexamethylene diisocyanate, in which case the group $R_1$ in the prepolymer will have the structure —(CH$_2$)$_4$—, —(CH$_2$)$_5$— or —(CH$_2$)$_6$—.

Our invention has been described hereinbefore with reference to the use of diols and diisocyanates in the production of the isocyanate-ended prepolymer and the vinyl-ended prepolymer, that is, with reference to prepolymers in which the groups $R_1$ and $R_2$ are each divalent organic groups. However, it is to be understood that polyols and/or polyisocyanates having a functionality greater than 2 may be used, if desired, in which case the groups $R_1$ and/or $R_2$ may have a valency greater than two, although the amount of such polyols and/or polyisocyanates used should not be such as to lead to an undue increase in the viscosity of the mixture of the vinyl-ended prepolymer in the vinyl monomer with which it is to be copolymerised and which will prevent satisfactory moulding being achieved.

Where, for example, a polyisocyanate having a functionality greater than two is used, e.g. a triisocyanate, the polyisocyanate may, before reaction with the diol to form the isocyanate-ended prepolymer, be reacted with a suitable amount of a monofunctional isocyanate-reactive compound, e.g. an alcohol, an amine, or a carboxylic acid, so as to bring the average functionality of the polyisocyanate down approximately to two. The polyisocyanate may even be reacted with a vinyl monomer containing an isocyanate-reactive group in which case the group $R_1$ in the vinyl-ended prepolymer will carry a vinyl group.

Similarly, where a polyol having a functionality greater than two is used, e.g. a triol, the polyol may, before reaction with the polyisocyanate to form the isocyanate-ended prepolymer, be reacted with a suitable amount of a monofunctional compound reactive with hydroxyl group, e.g. an isocyanate or a carboxylic acid, so as to bring the average functionality of the polyol down approximately to two.

A particularly suitable polyisocyanate having a functionality of greater than two is that sold as Suprasec DN by Imperial Chemical Industries Limited and containing 4:4'-diisocyanatodiphenyl methane and other polyisocyanates and having an average isocyanate functionality of 2.8.

The vinyl monomer which is reacted with the isocyanate-ended prepolymer to prepare the vinyl-ended prepolymer may possess any suitable group which is reactive with an isocyanate group e.g. —OH, —COOH, —NH$_2$, —CONH$_2$.

The vinyl monomer may be, for example, acrylic acid or a derivative thereof having the structure: where R$_3$ is hydrogen or a hydrocarbyl group, for ex- $$CH_2=\overset{R_3}{\underset{|}{C}}-COOH$$

where R$_3$ is hydrogen or a hydrocarbyl group, for example, alkyl, e.g. methyl. In this case the group —X— in the prepolymer of structure I has the structure:

$$-\underset{\underset{O}{\|}}{C}-$$

after elimination of carbon dioxide from the initially formed product of reaction.

Other suitable vinyl monomers include, for example, hydroxyl containing monomers having the structure:

$$CH_2=\overset{R_3}{\underset{|}{C}}-COO-(CH_2)_p-OH$$

where R$_3$ is hydrogen or a hydrocarbyl group, for example alkyl, e.g. methyl, and $p$ is a whole number of at least 2, and is preferably 2, or derivatives of said monomer in which one or more of the hydrogen atoms in the group —(CH$_2$)$_p$— are substituted by a hydrocarbyl group, for example, alkyl, e.g. methyl. In this case the group —X— in the vinyl-ended prepolymer of structure I has the structure —COO—(CH$_2$)$_p$—O—CO—.

Suitable examples include hydroxy ethyl or hydroxy propyl acrylate or methacrylate made by reaction of acrylic acid or methacrylic acid with ethylene oxide or propylene oxide in which case the group X in the vinyl-ended prepolymer will have the structure $$-COO\left(\overset{R_6}{\underset{|}{C}H}-\overset{R_7}{\underset{|}{C}H}\right)_2-O-CO-$$

in which, respectively, both R$_6$ and R$_7$ are hydrogen, or one of R$_6$ and R$_7$ is hydrogen and the other is methyl.

Other suitable isocyanate-reactive vinyl monomers include allyl alcohol, in which case the group X in the vinyl-ended prepolymer has the structure —CH$_2$—O—CO—, and acrylamide and methacrylamide, in which case the group X in the vinyl-ended prepolymer has the structure —CONH—OCO—.

The mixture of vinyl monomer and vinyl-ended prepolymer may contain other material copolymerisable with the vinyl monomer, for example, other vinyl-ended prepolymer containing urethane groups as in structure I but having structural features outside the scope of those specified in structure I. For example, the diol and diisocyanate from which the isocyanate-ended prepolymer, and thus vinyl-ended prepolymer, is prepared may both be free of cyclic groups, and in the case where one or both contains a cyclic group, they may be such that in the prepolymers derived therefrom there may be more than 30 atoms between adjacent cyclic groups in the prepolymer chains.

However, if the benefits of our invention are to be realised, that is, resins having a good combination of properties and in particular a good combination of impact strength and thermal properties, the other material in the mixture which is copolymerisable with the vinyl monomer should desirably not exceed 50% by weight of the total material, including the vinyl-ended prepolymer of structure I, copolymerisable with the vinyl monomer in the mixture, and preferably should not exceed 30% or even 10% by weight of the total material, including the vinyl-ended prepolymer of structure I, copolymerisable with the vinyl monomer in the mixture. For example, where the other material in the mixture is a vinyl-ended prepolymer having a structure outside the scope of structure I then desirably not more than 50% by weight, and preferably not more than 30% or even 10% by weight, of the diol and/or diisocyanate from which the isocyanate-ended prepolymer, and thus the vinyl-ended prepolymer is prepared, is a diol and/or a diisocyanate which would lead to a prepolymer having structural features, or to units in a prepolymer having structural features, outside the scope of the vinyl-ended prepolymer of structure I.

Vinyl monomers, which may be used in admixture, and with which the vinyl-ended urethane prepolymers may be copolymerised to produce the resins of our invention include vinyl esters, aromatic vinyl compounds and vinyl nitriles. Preferred vinyl monomers include those in which the ethylenically unsaturated double bond is situated adjacent to a carbonyl group, e.g. as in vinyl esters of acrylic and methacrylic acids.

Suitable vinyl esters include, for example, vinyl acetate and esters of acrylic acid having the formula $$CH_2=CH-COOR_8,$$

where R$_8$ is an alkyl, aryl, alkaryl, aralkyl or cycloalkyl group. For example R$_8$ may be an alkyl group having from 1 to 20, and preferably 1 to 10 carbon atoms. Particular vinyl esters which may be mentioned include for example, methyl acrylate, ethyl acrylate, n- and iso-propyl acrylates, and n-, iso- and tertiary-butyl acrylates.

Other suitable vinyl esters include, for example, esters of formula CH$_2$=C(R$_9$)COOR$_8$, where R$_9$ may be an alkyl, e.g. a methyl group. In the ester of formula CH$_2$=C(R$_9$)COOR$_8$, R$_8$ and R$_9$ may be the same or different. Particular vinyl esters which may be mentioned include, for example, methyl methacrylate, ethyl methacrylate, n- and iso-propyl methacrylate, and n-, iso- and tertiary-butyl methacrylate.

Aromatic vinyl compounds which may be mentioned include, for example, styrene and derivatives thereof, e.g. α-alkyl derivatives of styrene, e.g. α-methyl styrene, and vinyl toluene.

Suitable vinyl nitriles include, for example acrylonitrile and derivatives thereof, e.g. methacrylonitrile.

Polyfunctional vinyl monomers, that is, monomers containing two or more vinyl groups are also suitable. Suitable monomers include, for example, glycol dimethacrylate, divinyl benzene, diallyl phthalate, and triallyl cyanurate.

Another suitable vinyl monomer is vinyl pyrrolidone.

The mixture of our invention may be used to produce fibre-reinforced composite articles, for example, by impregnation of a fibrous material with the mixture, and in a further embodiment of our invention we provide a prepreg comprising a fibrous material impregnated with a mixture of at least one vinyl-ended prepolymer and at least one vinyl monomer as hereinbefore described, the prepreg containing from 5% to 80%, preferably from 20% to 50%, by weight of fibrous material by weight of the prepreg.

Fibre reinforcement of the resins produced by copolymerisation of the mixtures containing fibrous reinforcement results in improvements in impact strength and flexural properties of the resins, and in particular results in products having desirable inter-laminar shear strength.

Suitable fibre reinforcing materials include, for example, glass, e.g. in the form of mat, tapes, continuous fibre or chopped rovings. Other fibre reinforcing materials which may be used include, for example, carbon fibres, asbestos fibres, and fibres of organic polymeric materials, e.g. polyamides and polyesters.

The fibre-reinforced composite materials may be produced, for example, by placing the fibres in a mould of the desired shape and then impregnating the fibres with a fluid mixture of the vinyl-ended prepolymer and the vinyl monomer or mixture thereof with which the vinyl-ended prepolymer is to be copolymerised. The mixture of vinyl-ended prepolymer and vinyl-monomer may then be caused or allowed to copolymerise.

Where the mixture of vinyl-ended prepolymer and vinyl monomer is very viscous and is thus not sufficiently fluid for satisfactory impregnation of the fibres the said mixture may be diluted with a low boiling solvent in order to provide a mixture of the desired fluidity, the low boiling solvent being caused or allowed to evaporate before the mixture is copolymerised. If desired, the vinyl-ended prepolymer may be prepared in the low boiling solvent.

Where fluid mixtures suitable for impregnation of fibres at ambient temperatures are desired the ratio of vinyl-ended prepolymer:vinyl monomer with which it is to be copolymerised may suitably be in the range 60%:40% to 30%:70% by weight.

A particularly preferred process comprises impregnating a layer of fibres, e.g. a mat, with excess of the fluid mixture of vinyl-ended prepolymer and vinyl monomer, applying pressure to squeeze out the excess, e.g. using a leaky mould, and then heating the composite to cure the prepolymer and vinyl monomer mixture.

Where comparatively thick articles are required, it is preferred to prepare a number of impregnated layers in the manner just described, to form a stack of these layers and then to heat the stack to copolymerise the mixture, preferably while pressing the layers together.

The mixtures of our invention may also be copolymerised in such a way as to form products having a cellular structure. Resins having a cellular structure may most conveniently be prepared by including a blowing agent in the mixture of vinyl-ended prepolymer and vinyl monomer or mixture thereof to bring about a foaming reaction during the copolymerisation process.

Particularly suitable blowing agents for use in producing foamed resins include inert low boiling-point liquids which vapourise under the influence of the exothermic curing polymerisation reaction.

Suitable low boiling point liquids are liquids that are inert towards the prepolymer and have boiling points not exceeding 100° C. at atmospheric pressure and preferably not exceeding 50° C. Examples of such liquids are halogenated hydrocarbons such as methylene chloride, ethylene chloride, vinylidene chloride, and particularly fluorinated hydrocarbons such as trichlorofluoromethane, dichlorodifluoromethane, dichloromonofluoromethane, monochlorodifluoromethane, dichlorotetrafluoromethane, 1,1,2-trichloro-1,2,2 - trifluoromethane, dibromodifluoromethane and monobromotrifluoroethane. Mixtures of these low boiling point liquids one with another and/or with other substituted or unsubstituted hydrocarbons may also be used. Such liquids are usually employed in amounts of from 5% to 40% of the weight of the mixture.

The blowing agent may be conveniently included in the reaction mixture so that foaming and copolymerisation proceed simultaneously.

The mixtures of our invention, and resins produced therefrom, may include heat and light stabilisers, antioxidants and antiozonants and colouring pigments, and particulate fillers materials, e.g. chalk, calcium carbonate, talc, mica and carbon black.

The resins produced from the mixtures of our invention by copolymerisation of the vinyl monomer and the vinyl-ended prepolymer may be used, for example as casting resins in the production of panels and furniture, and particularly when in the form of fibre reinforced resins, may be used in the production of storage tanks panels for automobile bodies and as pipes.

The invention is now illustrated by the following examples in which all parts are expressed as parts by weight.

Tensile strengths were measured on an E-type tensometer at a strain rate of 10% per minute employing curved samples 7.62 cm. long, with a radius of curvature of 3.165 cm. and thickness of the narrow section of 0.3165 cm. as described in Encyclopedia of Polymer Science and Technology 1967, vol. 7, pp. 261–361. Tensile moduli and elongation to break were measured using parallel-sided specimens 4" x ¼" x ¼".

Flexural strengths and flexural moduli were measured using the procedure outlined in ASTM D790(B) employing a strain rate of 10%/min. span depth of 16:1 on samples 5" x ½" x ¼".

Impact data were obtained using a Charpy type impact tester on rectangular specimens 2" x ¼" x ⅛" which were either unnotched or had a V-shaped 45° notch 0.11" deep and 0.010" radius.

Heat distortion temperatures were measured on rectangular specimens 1" x ¼" x 1/16" according to British Standard 102C but with the sample in a fanned air oven and using a heating rate of 2° C. per minute.

Interlaminar shear strengths were measured on an E-type tensometer using a test piece of width 5.0 mm., depth 2.5 mm. and length 16.0 mm., the span of the 3 point bend being 12.5 mm. The sample was tested at a cross-head speed of 5 mm./min. and a chart speed of 100 mm./min. The interlaminar shear strength is given by the formula $$\frac{0.75P}{BD} 9.81 \text{ MNm.}^{-2}$$

where

P=load in kg. at which failure first occurs
B=width of sample mm.
D=depth of sample mm.

Dramatic deformation modulus was measured by the method described in Transactions J. Plastics Institute, October 1965, page 177.

EXAMPLE 1

137.6 parts of a condensate obtained by reacting 2:2-bis(p-hydroxyphenyl)propane and propylene oxide in a molar ratio of 1:2 were heated and stirred at 70° C. under an absolute pressure of 1 mm. Hg for 30 minutes.

200 parts of 4:4'-diisocyantodiphenyl methane were similarly heated and stirred separately. The condensate and the diisocyanate (molar proportion of diisocyanate:condensate 2:1) were then cooled to 40 to 50° C. and mixed together and stirred under a vacuum of 1 mm. Hg for 4–5 minutes while maintaining the temperature of the mixture at 50–60° C. by means of external cooling. The vacuum was then released and 110.3 parts of styrene, which had previously been placed under a vacuum of 1 mm. Hg at 25° C. for 30 minutes, and 0.15 part of stannous octoate were added and the resultant mixture was stirred at 50–60° C. for 30 minutes. The mixture was initially cooled by means of an ice-bath to control the exotherm produced by the urethane prepolymer formation reaction and in the later stages of the reaction the mixture was warmed in order to complete the urethane prepolymer formation.

103.4 parts of 2-(hydroxyethyl)methacrylate, which had previously been placed under a vacuum of 1 mm. Hg at 25° C. for 30 minutes, were then added and the resultant mixture was stirred at 50–60° C. for 20 minutes. 1.4 parts of di-tertiary-butyl peroxide were then added and a vacuum of 1 mm. of Hg was applied to the mixture for 5 minutes.

The vacuum was released and the mixture comprising a solution of 20% by weight of styrene and 80% by weight of vinyl-ended prepolymer was transferred to a mould formed of a pair of 12 inch x 12 inch glass plates separated by a ¼-inch or ⅛-inch deep 1-inch wide rubber gasket, the depth of the gasket being chosen to give the desired thickness of sheet. The mould, which had previously been heated to 140° C. for 3 hours and cooled to 80–90° C. was filled through a cavity in the gasket and excess mixture was squeezed out of the mould. The mould was held together by means of spring clips.

The mould was placed in an oven in an upper position and heated at a temperature of 100° C. for 1 hour and 140° C. for 16 hours. The mould was then removed from the oven, allowed to cool and the sheet removed from the mould.

The sheet had the following properties:

Tensile strength: 103.5 MNm.$^{-2}$
Tensile modulus: 3.52 GNm.$^{-2}$
Elongation to break: 5.5%
Flexural strength: 138 MNm.$^{-2}$
Flexural modulus: 3.24 GNm.$^{-2}$
Notched impact strength: 2.46 KJm.$^{-2}$
Unnotched impact strength: 42.3 KJm.$^{-2}$
Heat distortion temperature: 154° C.

EXAMPLE 2

The procedure of Example 1 was followed except that 137.6 parts of the condensate obtained by reacting 2,2-bis(p-hydroxyphenyl)propane with propylene oxide in a molar ratio of 1:2, 133.2 parts of 4,4'-diisocyanatodiphenylmethane (molar proportion of diisocyanate:condensate (4:3), 34.8 parts of 2-(hydroxyethyl) methacrylate and 91.7 parts of styrene were used to produce a mixture comprising a solution of 23.8% by weight of styrene and 76.2% by weight of vinyl-ended prepolymer.

The cured sheet removed from the mould had the following properties:

Tensile strength: 89.5 MNm.$^{-2}$
Flexural strength: 131 MNa.$^{-2}$
Flexural modulus: 2.78 GNm.$^{-2}$
Notched impact strength: 4.9 KJm.$^{-2}$
Unnotched impact strength: 38.2 KJm.$^{-2}$
Heat distortion temperature: 132.5° C.

EXAMPLE 3

The procedure of Example 1 was followed except that 45.9 parts of the condensate obtained by reacting 2,2-bis(p-hydroxyphenyl)propane with propylene oxide in a molar ratio of 1:2, 66.7 parts of 4,4'-diisocyanatodiphenylmethane (molar proportion of diisocyanate:condensate 2:1), 34.5 parts of 2-(hydroxyethyl) methacrylate and 147.0 parts of styrene were used and tertiary butyl peroctoate was used in place of di-tertiary butyl peroxide as the free radical initiator. The resultant mixture comprised a solution of 50% by weight of styrene and 50% by weight of vinyl-ended prepolymer.

The vinyl-ened prepolymer in styrene solution had a viscosity of 74.4 cps. at 25° C. when measured using a Brookfield viscometer.

It was cured at 65° C. for 20 hours, 90° C. for 1 hour and 140° C. for 2 hours and specimens cut from the cured sheet had the following properties:

Tensile strength: 82.5 MNm.$^{-2}$
Tensile modulus: 3.2 GNm.$^{-2}$
Flexural strength: 136.5 MNm.$^{-2}$
Flexural modulus: 2.71 GNm.$^{-2}$
Heat distortion temperature: 126° C.

EXAMPLE 4

The procedure of Example 1 was followed except that 23.2 parts of 1,3-cyclohexane diol in place of the condensate of 2:2'-bis(p-hydroxyphenyl)propane and propylene oxide, 100.0 parts of 4,4'-diisocyantodiphenylmethane (molar proportion of diisocyanate:diol 2:1), 51.9 parts of 2-(hydroxyethyl) methacrylate, 30.8 parts of styrene, 0.10 part of stannous octoate and 0.65 part of di-tertbutyl peroxide were used. The resultant mixture comprised a solution of 15% by weight of styrene and 85% by weight of vinylended prepolymer.

The resin cured at 140° C. for 16 hours had the following properties:

Tensile strength: 104.5 MNm.$^{-2}$
Heat distortion temperature: 160° C.

EXAMPLE 5

The procedure of Example 1 was followed except that 39.3 parts of a diol 4,8-bis(hydroxymethyl)tricyclo-[5,2,10$^{2,6}$]decane in place of the condensate of 2:2-bis(p-hydroxyphenyl)propane and propylene oxide, 75.0 parts of 4,4'-diisocyantodiphenylmethane (molar proportion of diisocyanate:diol 3:2), 26.0 parts of 2-(hydroxyethyl) methacrylate, 42.1 parts of styrene, 0.10 part of stannous octoate and 0.5 part of di-tert-butyl peroxide were used. The resultant mixture comprised a solution of 23% by weight of styrene and 77% by weight of vinylended prepolymer. The resin cured at 140° C. for 16 hours had a tensile strength of 120 MNm.$^{-2}$ and a heat distortion temperature of 157° C.

EXAMPLE 6

The procedure of Example 1 was followed except that 51.6 parts of the condensate obtained by reacting 2,2-bis-(p-hydroxyphenyl)propane with propylene oxide in a molar ratio of 1:2, 56.4 parts of 4,4'-diisocyantodiphenylmethane (molar proportion of diisocyanate:condensate 3:2), 10.65 parts of acrylamide in place of the 2-(hydroxyethyl) methacrylate and 47.0 parts of styrene were used. The resultant mixture comprised a solution of 28.4% by weight of styrene and 71.6% by weight of vinyl-ended prepolymer.

The resin cured at 140° C. for 18 hours, had the following properties:

Tensile strength: 101 MNm.$^{-2}$
Flexural strength: 131 MNm.$^{-2}$
Flexural modulus: 2.9 GNm.$^{-2}$
Heat distortion temperature: 164° C.

EXAMPLE 7

The procedure of Example 1 was followed except that 68.8 parts of the condensate obtained by reacting 2,2-bis (p-hydroxyphenyl)propane with 2 moles of propylene oxide in a molar ratio of 1:2, 66.7 parts of 4,4'-diisocyanatodiphenylmethane (molar proportion of diisocyanate:condensate 4:3), 17.4 parts of 2-(hydroxyethyl) methacrylate and 152.8 parts of styrene were used and 1.4 parts of tertiary butyl peroctoate was used as the free radical initiator in place of the ditertiary butyl peroxide.

The solution of 50% by weight of vinyl-ended prepolymer and 50% by weight of styrene had a viscosity of 244 cps. at 25° C. when measured using a Brookfield viscometer.

The resin cured at 65° C. for 20 hours, 90° C. for 1 hour and 140° C. for 2 hours had the following properties:

Tensile strength: 86.6 MNm.$^{-2}$
Tensile modulus: 3.26 GNm.$^{-2}$
Flexural strength: 129.4 GNm.$^{-2}$
Flexural modulus: 2.86 GNm.$^{-2}$
Heat distortion temperature: 110° C.

EXAMPLE 8

The procedure of Example 1 was followed except that 68.8 parts of the condensate obtained by reacting 2:2-bis(p-hydroxyphenyl)propane with propylene oxide in a molar ratio of 1:2, 26 parts of 2-(hydroxyethyl) methacrylate, and 36.8 parts of styrene were used, and 52.2 parts of a mixture of 2:4- and 2:6-tolylene diisocyanate were used in place of the 4:4'-diisocyanatodiphenylmethane (molar proportion of diisocyanate:condensate 3:2).

The mixture comprising 20% by weight of styrene and 80% by weight om vinyl-ended prepolymer charged to the mould was heated at 100° C. for 1½ hours and 140° C. for 16 hours and the sheet removed from the mould had the following properties:

Tensile strength: 110 MNm.$^{-2}$
Tensile modulus: 2.08 GNm.$^{-2}$
Unnotched impact strength: 30.2 KJm.$^{-2}$
Heat distortion temperature: 130° C.

EXAMPLE 9

The procedure of Example 1 was followed except that 26 parts of 2-(hydroxyethyl)methacrylate and 23.35 parts of styrene were used, and the condensate used in Example 1 was replaced by 15.2 parts of propylene glycol and the 4:4'-diisocyanatodiphenylmethane by 52.2 parts of a mixture of 2:4- and 2:6-tolylene diisocyanate (molar proportion of diisocyanate:glycol 3:2).

The mixture comprising a solution of 20% by weight of styrene and 80% by weight of vinyl-ended prepolymer charged to the mould was heated at 90° C. for 1 hour and at 140° C. for 18 hours and the sheet removed from the mould had the following properties:

Tensile strength: 140 MNm.$^{-2}$
Tensile modulus: 2.70 GNm.$^{-2}$
Unnotched impact strength: 22.2 KJm.$^{-2}$
Heat distortion temperature: 147° C.

EXAMPLE 10

The procedure of Example 1 was followed except that 13 parts of 2-(hydroxyethyl)methacrylate and 11.3 parts of styrene were used, and the condensate used in Example 1 was replaced by 6.2 parts of ethylene glycol and the 4:4'-diisocyanatodiphenyl methane by 26.1 parts of a mixture of 2:4- and 2:6-tolylene diisocyanate (molar proportion of diisocyanate:glycol 3:2).

The mixture comprising a solution of 20% by weight of styrene and 80% by weight of vinyl-ended prepolymer charged to the mould and heated following the procedure of Example 1 had the following properties:

Tensile strength: 158 MNm.$^{-2}$
Tensile modulus: 2.90 GNm.$^{-2}$
Heat distortion temperature: 142° C.

EXAMPLE 11

The procedure of Example 1 was followed to produce a mixture comprising a solution of styrene and vinyl-ended prepolymer except that 341 parts of styrene were used and the di-tertiary butyl peroxide was replaced by 6.8 parts of methyl ethyl ketone peroxide with 11% of available oxygen (Laporte SD2) and 16.4 parts of a 1% by weight solution of Cobalt complex in styrene (Novadel 49/ST).

A mould was formed by placing a 1 inch wide 3/16 inch deep rubber gasket on a polytetrafluoroethylene lined poly(ethylene terephthalate) film, the film resting on a steel plate and the gasket having outer dimensions of 12 inches x 12 inches.

A portion of the mixture comprising a solution of 43.6% by weight of styrene and 56.4% by weight of the vinyl-ended prepolymer was poured into the cavity of the mould and spread out to cover the bottom of the mould cavity and a chopped strand glass mat (Fibreglass FGE 2000) was placed on the mixture in the mould. Thereafter a further portion of the mixture was poured over the glass mat and the contents of the mould were gently pressed with a spatula using hand pressure in order to thoroughly wet the glass with the mixture. Thereafter a further layer of glass mat was placed in the mould followed by a further portion of the mixture and the addition of glass mat and mixture was then repeated once more.

The mould was closed by placing a polytetrafluoroethylene lined poly(ethylene terephthalate) film over the cavity followed by a steel plate and the mould was placed in a press at room temperature for 24 hours and a pressure of 300 lb./sq. in.$^{-1}$ applied. The mould was then heated at 100° C. for 2 hours.

The fibre-reinforced sheet removed from the mould contained 26.3% of glass by weight of the sheet and had the following properties:

Flexural strength: 163.7 MNm.$^{-2}$
Flexural modulus: 6604 MNm.$^{-2}$
Tensile strength: a 108.7 MNm.$^{-2}$
Tensile modulus: a 6123 MNm.$^{-2}$
Charpy unnotched impact strength 80 KJm.$^{-2}$ a Measured according to ASTM D638, Type II.

EXAMPLE 12

A mixture comprising a solution of 50% by weight of styrene and 50% by weight of vinyl-ended prepolymer was prepared following the procedure of Example 1 except that 0.2 part of dibutyl tin dilaurate was used in place of the stannous octoate and 0.9 part of tertiary butyl peroctoate was used in place of the di-tertiary butyl peroxide, and 153.6 parts of the condensate used in Example 1, 200 parts of diisocyanatodiphenylmethane, 104 parts of 2-(hydroxyethyl) methacrylate and 457.6 parts of styrene were used (molar proportion of diisocyanate:condensate 9:5). The mixture also contained 0.18 part of tertiary butyl catechol.

Glass fibre roving (polyester compatible, 3 ended) was passed from a reel through a vessel containing the mixture of styrene and the vinyl-ended prepolymer and the impregnated roving was wound on a NOL ring having a width of ¼-inch and a diameter of 5.75 inch. The impregnated glass fibre roving was wound on the ring with overlapping to a depth of ⅛-inch.

The NOL ring carrying the impregnated glass fibre was heated in an oven at 60° C. for 2 hours and for 16 hours at 135° C.

The NOL ring was removed from the oven and the glass fibre reinforced ring was removed from the NOL ring. The glass fibre reinforced ring, which had a density of 1.88 g. ml.$^{-1}$ and a glass-fibre content of 74.3% by weight, had the following properties:

Diametric deformation modulus: 38.7 GNm.$^{-2}$
Inter-laminar shear strength: 31.1 MNm.$^{-2}$

EXAMPLE 13

68.8 parts of a condensate obtained by reacting 2:2-bis-(p-hydroxyphenyl)propane and propylene oxide in a molar ratio of 1:2 and 66.6 parts of 4:4'-diisocyanatodiphenylmethane were separately heated and stirred at 70° C. under an absolute pressure of 1 mm. Hg for 30 minutes.

The condensate and the diisocyanate (molar proportion of diisocyanate:condensate 4:3) were then cooled to 40–50° C. and mixed together and stirred 5 minutes while being cooled in a water bath. 400 parts of methylene chloride were then added followed by 0.1 part of stannous octoate. The mixture was stirred until the temperature dropped to room temperature. Thereafter 17.4 parts of 2-(hydroxyethyl) methacrylate which had been placed under a vacuum of 1 mm. Hg at 25° C. for 30 minutes were added and the mixture was stirred for 15 minutes.

38.2 parts of styrene which had been previously placed under a vacuum of 1 mm. Hg for 30 minutes at 25° C. were then added followed by 0.6 part of ditertiary butyl peroxide.

The resultant mixture comprised a solution in methylene chloride of 20% by weight of styrene and 80% weight of vinyl-ended prepolymer.

11 parts by weight of a mat of carbon fibre was impregnated with 42 parts of the methylene chloride solution and the methylene chloride was removed by blowing hot air over the mat.

The impregnated mat was then cut into 3 in. x 1½ in. pieces and 26 such pieces were stacked in a mould and the stack was heated in the mould for 15 minutes at 100° C., and 140° C. for 2 hours to produce a carbon fibre reinforced composite containing 72.2% by weight of carbon fibre.

The composite was cut into two pieces, one of which was post-cured at 140° C. for 16 hours.

The interlaminar shear strength of the post-cured composite was 39.9 MNm.$^{-2}$ and that of the composite which was not post-cured was 34.9 MNm.$^{-2}$.

EXAMPLE 14

The procedure of Example 1 was followed except that the condensate used in Example 1 was replaced by 129.6 parts of a condensate obtained by reacting 2:2-bis(p-hydroxyphenyl)propane with propylene oxide in a molar ratio of 1:4, and 142.9 parts of 4:4'-diisocyanatodiphenylmethane (molar proportion of diisocyanate:condensate 2:1), 74.3 parts of 2-(hydroxyethyl)methacrylate and 346.8 parts of styrene were used, and in place of the stannous octoate 0.34 part of dibutyl tin dilaurate were used together with 1.4 parts of tertiary butyl peroctoate in place of the di-tertiary butyl peroxide.

The mixture comprising a solution of 50% by weight of styrene and 50% by weight of vinyl-ended prepolymer, which had a viscosity at 25° C. of 181 cps. as measured on a Brookfield viscometer, was charged to the mould and heated at 60° C. for 16 hours and 130° C. for 3 hours and the sheet removed from the mould had the following properties:

Notched impact strength: 1.87 KJm.$^{-2}$
Heat distortion temperature: 106° C.

EXAMPLE 15

26.7 parts of the condensate as used in Example 1, 7.2 parts of a condensate obtained by reacting 2:2-bis(p-hydroxyphenyl)sulphone with propylene oxide in a molar ratio of 1:2 and 50 parts of 4:4'-diisocyanatodiphenylmethane were stirred at 60° C. under a vacuum of 1 mm. of mercury absolute for 1 hour (molar ratio of diisocyanate:condensate 2:1). The temperature of the mixture was then raised to 72° C. and 109.7 parts of styrene were added.

25.8 parts of 2-(hydroxyethyl) methacrylate and 0.02 part of dibutyl tin dilaurate were added to the mixture and the mixture was maintained at 55° C. for 1 hour after which time it was cooled to 30° C. and 0.2 part of ditertiary butyl peroctoate added.

The mixture which contained 50% by weight of styrene and 50% by weight of vinyl-ended prepolymer was charged to a mould as used in Example 1 and heated at 60° C. for 2 hours and 130° C. for 16 hours to produce a sheet having the following properties:

Flexural modulus: 2.8 GNm.$^{-2}$
Flexural strength: 126 MNm.$^{-2}$
Notched impact strength: 2.2 KJm.$^{-2}$
Unnotched impact strength: 12.4 KJm.$^{-2}$
Heat distortion temperature: 134° C.

EXAMPLE 16

In two experiments, Experiments A and B, the procedure of Example 3 was followed to produce a mixture comprising a solution of 50% by weight of styrene and 50% by weight of vinyl-ended prepolymer except that the ditertiary butyl peroxide was omitted.

To 140 parts of each mixture there was added 0.15 part of di-tertiary butyl peroctoate and, in Experiment A 7 parts of methyl methacrylate, and in Experiment B 14 parts of methyl methacrylate. The mixtures contained respectively 52.4% and 54.5% by weight of vinyl monomer (methyl methacrylate plus styrene).

In each experiment the mixtures were charged to moulds as used in Example 1 and heated for 2 hours at 60° C. and 100° C. for 3 hours.

The sheet had the following properties:

| Experiment | A | B |
| --- | --- | --- |
| Flexural modulus, GNm.$^{-2}$ | 3.8 | 3.8 |
| Flexural strength, MNm.$^{-2}$ | 142 | 142 |
| Notched impact strength, KJm.$^{-2}$ | 1.6 | 1.9 |
| Unnotched impact strength, KJm.$^{-2}$ | 15.6 | 12.1 |
| Heat distortion temperature, ° C | 120 | 127 |

EXAMPLE 17

The procedure of Example 1 was followed except that 76.8 parts of the condensate as used in Example 1, 100 parts of 4:4'-diisocyanatodiphenylmethane, and 234.4 parts of styrene were used, and in place of the 2-(hydroxyethyl) methacrylate and stannous octoate there was used, respectively, 57.6 parts of hydroxyisopropyl methacrylate (20:80 mixture of 1-methyl - 2 - hydroxyethyl methacrylate and 2-hydroxypropyl methacrylate) and 0.2 part of dibutyl tin dilaurate. (Molar proportion of diisocyanate:condensate 2:1). The mobile solution contained 50% by weight of styrene and had a viscosity of 350 cps. as measured on a Brookfield viscometer at 25° C. A portion of the solution containing 0.2% by weight of tertiary butyl catechol inhibitor was stirred at room temperature for 4 months after which time the viscosity of the solution had increased to 400 cps. The solution was still mobile.

The remainder of the solution was heated in a mould following the procedure of Example 1 for 16 hours at 60° C. and for 2 hours at 130° C. The sheet removed from the mould had the following properties:

Tensile strength: 78 MNm.$^{-2}$
Tensile modulus: 3.7 GNm.$^{-2}$
Unnotched impact strength: 23.1 KJm.$^{-2}$
Heat distortion temperature: 125° C.

EXAMPLE 18

Experiment A: 38.4 parts of a condensate as used in Example 1 were heated and stirred at 60° C. for 30 minutes under a pressure of 1 mm. Hg absolute. 81.6 parts of a polyisocyanate containing 4:4'-diisocyanatophenylmethane and having a functionality of 2.8 and a molecular weight of 408 (Suprasec DN Imperial Chemical Industries Limited) were similarly heated and stirred.

83.4 parts of styrene, then a first portion comprising 20.8 parts of degassed 2-(hydroxyethyl) methacrylate, and 0.04 part of dibutyl tin dilaurate were added to the polyisocyanate which was stirred at 50° C. for 1 hour.

Thereafter the condensate dissolved in 83.4 parts of styrene and containing 0.2 part of dibutyl tin dilaurate was added to the polyisocyanate and the resultant solution was stirred at 50–60° C. for 1 hour. A second portion comprising 28.0 parts of 2-(hydroxyethyl) methacrylate was added to the solution and the solution was stirred at 50° C. to 60° C. for 1 hour.

Experiments B and C: The procedure of Experiment A was repeated except that, respectively, 76 parts and 31.7 parts of the condensate, 163.5 parts and 68.1 parts of the Suprasec DN, 10.2 parts methanol and 29.1 parts of 2,3-dibromopropanol in place of the first portion of 2-(hydroxyethyl) methacrylate, 52 parts and 21.7 parts of a second portion of 2-(hydroxyethyl) methacrylate and 302 parts and 150.6 parts of styrene were used.

A portion of solution A containing 0.2% by weight of tertiary butyl catechol was stirred at room temperature for 4 months. During this time the viscosity of the solution increased from 300 cps. to 500 cps. and the solution remained a mobile solution.

Portions of the solutions A, B and C containing 1% by weight of tertiary butyl peroctoate were heated in a mould as used in Example 1. The solutions contained 50% by weight of styrene and in each solution the molar proportion of the polyisocyanate:condensate in the vinyl-ended prepolymer was 2:1. The sheets removed from the moulds had the following properties:

| Experiment | A | B | C |
|---|---|---|---|
| Heating conditions | (1) | (1) | (2) |
| Heat distortion temperature, °C | 133 | 110 | 108 |
| Tensile strength, MNm.$^{-2}$ | 87.5 | 75.8 | 77.2 |
| Tensile modulus, GNm.$^{-2}$ | 3.4 | 3.7 | 3.5 |
| Unnotched impact strength, KJm.$^{-2}$ | 23.4 | 17.8 | 16.7 |

[1] 16 hours, 60° C./2 hours, 140° C.
[2] 2 hours, 70°C./16 hours, 140° C.

EXAMPLE 19

Experiment A: 142.9 parts of 4:4'-diisocyanatodiphenylmethane were dissolved in 80 parts of styrene and added to a solution of 124.9 parts of polypropylene glycol (molecular weight 432.5) and 0.34 part of dibutyl tin dilaurate in 200 parts of styrene at 45° C. (molar proportion diisocyanate:glycol 2:1). An exotherm resulted in the solution and the temperature was maintained below 60° C. After ½ hour a solution of 74.3 parts of 2-(hydroxyethyl)methacrylate in 62 parts of styrene was added to the solution. The temperature was maintained below 60° C. 4.8 parts of tertiary butyl peroctoate were added to the solution and the solution was heated in a mould as used in Example 1.

Experiment B: The procedure of Experiment A was repeated except that 130.5 parts of a condensate as used in Example 1 in place of the polypropylene glycol, 126 parts of 1:6-hexamethylene diisocyanate in place of the 4:4'-diisocyanatodiphenylmethane, 97.5 parts of 2-(hydroxyethyl) methacrylate, and a total of 354 parts of styrene were used.

Experiment C: The procedure of Experiment A was repeated except that 38.3 parts of a condensate as used in Example 1, 55 parts of diisocyanatodiphenylmethane, 28.6 parts of 2-(hydroxyethyl) methacrylate and a total of 447.6 parts of styrene were used.

The solutions contained respectively 50%, 50% and 21.7% by weight of styrene and in each case the isocyanate-ended prepolymer was prepared from a molar proportion of 2:1 diisocyanate:diol.

The sheets removed from the moulds had the following properties:

| Experiment | A | B | C |
|---|---|---|---|
| Heating conditions | (1) | (1) | (2) |
| Notched impact strength, KJm.$^{-2}$ | 1.45 | 1.93 | 1.49 |
| Heat distortion temperature, °C | 91 | 92 | 110 |

[1] 16 hours, 60° C./2 hours, 130° C.
[2] 16 hours, 60° C./3 hours, 130° C.

By way of comparison the procedure of Experiment A was followed except that 144.2 parts of polypropylene glycol, 112 parts of 1:6-hexamethylene diisocyanate in place of the 4:4'-diisocyantodiphenylmethane (molar proportion 1:2), 86.7 parts of 2-(hydroxyethyl)methacrylate, and a total of 342.9 parts of styrene were used. The solution contained 50% by weight of styrene.

The solution was heated in a mould as used in Example 1 at 60° C. for 16 hours and 130° C. for 3 hours to produce a sheet having the following properties:

Notched impact strength: 3.51 KJm.$^{-2}$
Heat distortion temperature: 52° C.

EXAMPLE 20

In order to demonstrate the stability to boiling water of resins produced from the mixtures of vinyl-ended prepolymer and vinyl monomer a sheet was produced following the procedure of Example 1.

Samples of the sheet were immersed in boiling water for varying periods of time and, after drying, the properties of the samples were measured.

| Time of immersion, days | Flexural strength, MNm.$^{-2}$ | Flexural modulus, GNm.$^{-2}$ |
|---|---|---|
| 1 | 136 | 3.11 |
| 11 | 135 | |
| 29 | 141 | 3.07 |
| 79 | 143 | 3.04 |
| 183 | 142 | 3.32 |

Samples of the sheet were immersed in different liquids for 86 days and, after washing and drying, the change in weight of the samples was measured.

| Liquid | Percent weight increase | Appearance of sample |
|---|---|---|
| Methylated spirit | 0.92 | No change. |
| Xxlene | 0.35 | Do. |
| White spirit | 0.27 | Do. |
| 25% v./v. HNO$_3$ | 0.69 | Became orange coloured. |
| 30% v./v. H$_2$SO$_4$ | 0.37 | No change. |
| 20% w./v. NaOH | 0.56 | Do. |

A sheet was prepared following the procedure of Example 2 except that 305 parts of styrene were used.

Samples of the sheet were immersed for 3 weeks in a number of liquids and, after washing and drying, the weight increase of the samples was measured.

| Liquid | Temperature, °C. | Weight increase, percent |
|---|---|---|
| 10% w./v. NaOH | 25 | 0.28 |
| 10% v./v. HCl | 25 | 0.26 |
| Concentrated HCl | 25 | 0.35 |
| CCl$_4$ | 25 | 0.10 |
| Perchloroethylene | 25 | 0.60 |
| 10% w./v. NaOH | 90 | 0.41 |
| 10% v./v. HCl | 90 | 0.50 |

EXAMPLE 21

The procedure of Example 1 was followed to produce a solution of vinyl-ended prepolymer in styrene except that 153.6 parts of the condensate, 200.1 parts of 4:4'-diisocyanatodiphenylmethane, 103.5 parts of 2-(hydroxyethyl)methacrylate, 457.2 parts of styrene, and 0.2 part of dibutyl tin dilaurate in place of the stannous octoate, were used. The solution also contained 0.18 part of tertiary butyl catechol.

In order to demonstrate the storage stability of the solution the viscosity of the solution was measured in a Brookfield viscometer at 22° C. over varying periods of time with the following results.

Time hrs.:                                         Viscosity, cps.
   0 _____ 272
  24 _____ 296
  48 _____ 346
 138 _____ 292
 310 _____ 288
 354 _____ 288
 522 _____ 290
1194 _____ 290

EXAMPLE 22

The procedure of Example 1 was followed except that the condensate used (145.2 parts) was prepared by condensing 2:2-bis(p-hydroxyphenyl)propane with propylene oxide in a molar proportion of 1:8, and 110 parts of 4:4'-diisocyanatodiphenylmethane (molar proportion of diisocyanate:diol 2:1), 57.2 parts of 2-(hydroxyethyl) methacrylate, 312.4 parts of styrene, 0.26 part of dibutyl tin dilaurate in place of the stannous octoate and 6.2 parts of tertiary butyl peroctoate in place of the di-tertiary butyl peroxide were used. The solution contained 50% by weight of styrene.

The solution was heated in a mould as used in Example 1 for 16 hours at 60° C. and for 3 hours at 130° C.

The sheet removed from the mould had the following properties:

Notched impact strength: 2.03 KJm.$^{-2}$
Heat distortion temperature: 91° C.

EXAMPLE 23

352 parts of the condensate as used in Example 1 and 500 parts of 4:4'-diisocyanatodiphenylmethane were heated and degassed as in Example 1 (molar proportion of diisocyanate:condensate 2:1). The condensate and diisocyanate were mixed and 556 parts of methyl methacrylate and 0.3 part of dibutyl tin dilaurate were added to the solution and the solution was cooled so that the temperature did not exceed 55° C. After stirring for 1½ hours 260 parts of 2-(hydroxyethyl) methacrylate were added to the solution and the solution was stirred for a further 1½ hours.

90 parts of the solution was mixed with 30 parts of methyl methacrylate (50% by weight of methyl methacrylate in the resultant solution) and the solution was heated in a mould as used in Example 1 at 60° C. for 16 hours and 130° C. for 2 hours to produce a sheet having the following properties:

Notched impact strength: 1.35 KJm.$^{-2}$
Heat distortion temperature: 134° C.

EXAMPLE 24

The procedure of Example 1 was followed except that 435 parts of the condensate, 625 parts of 4:4'-diisocyanatodiphenylmethane (molar proportion of diisocyanate: condensate 2:1), 325 parts of 2-(hydroxyethyl) methacrylate, 1385 parts of styrene, 0.33 part of dibutyl tin dilaurate in place of the stannous octoate, and 27.7 parts of tertiary butyl peroctoate in place of the di-tertiary butyl peroxide were used. The mixture contained 50% by weight of styrene.

Samples of the sheet removed from the mould were immersed in liquids at 93° C. and the variation of properties with time measured.

| Time (months) | Liquid | Flexural strength, MNm.$^{-2}$ | Flexural modulus, GNm.$^{-2}$ |
| --- | --- | --- | --- |
| 0 | Water | 130 | 3.55 |
| 1 | do | 137 | 3.45 |
| 3 | do | 136 | 3.30 |
| 0 | Nitric acid 5% v./v | 130 | 3.55 |
| 1 | do | 56 | 3.45 |
| 0 | Hydrochloric acid 15% v./v | 130 | 3.55 |
| 1 | do | 123 | 3.47 |

What we claim is:

1. A polymerisable mixture comprising from 5% to 95% by weight of at least one prepolymer having the structure:

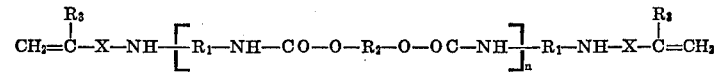

in which $R_1$ and $R_2$ are each organic groups at least one of which contains at least one cyclic group in the macromolecular chain of the prepolymer and are such that in said structure there are not more than 30 atoms in the chain between adjacent cyclic groups, $n$ is a whole number of from 1 to 20, the group $R_2$ has the structure

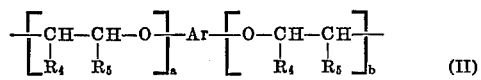

where Ar is a divalent aromatic group in which each free valency is on an aromatic carbon atom, $R_4$ and $R_5$ are hydrogen atoms or alkyl groups, and $a$ and $b$ are integers, and when $n$ is one and only $R_2$ contains at least one cyclic group in the chain there are not more than 30 atoms in the chain between the cyclic group in $R_2$ and the nitrogen atom attached to the group X, $R_3$ is hydrogen or a hydrocarbyl group and X is a divalent group, and from 95% to 5% by weight of at least one vinyl monomer substantially free of isocyanate-reactive groups and copolymerisable with said prepolymer.

2. A mixture as claimed in claim 1 in which in the prepolymer $n$ is not greater than 3.

3. A mixture as claimed in claim 1 in which in the prepolymer there are not more than 6 atoms between adjacent cyclic groups, and when $n$ is one and only $R_2$ contains at least one cyclic group in the chain there are not more than 6 atoms in the chain between the cyclic group in $R_2$ and the nitrogen atom attached to the group X.

4. A mixture as claimed in claim 1 in which the prepolymer and the vinyl monomer are present in a proportion of 60% to 40% by weight of prepolymer to 40% to 60% by weight of vinyl monomer.

5. A mixture as claimed in claim 1 in which in the Group $R_2$ Ar has the structure

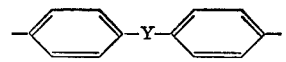

where Y is a divalent link selected from —SO$_2$—, —CH$_2$— or

6. A mixture as claimed in claim 1 in which in the group $R_2$ one of the groups $R_4$ and $R_5$ is hydrogen and the other is methyl.

7. A mixture as claimed in claim 1 in which in the prepolymer $R_3$ is H or CH$_3$.

8. A mixture as claimed in claim 1 in which in the prepolymer the group X has a structure selected from:

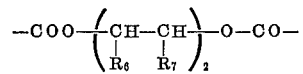

where one of $R_6$ and $R_7$ is H and the other is methyl or both of $R_6$ and $R_7$ are H.

9. A mixture as claimed in claim 1 in which the vinyl monomer is selected from styrene, methyl methacrylate and mixtures thereof.

10. A mixture as claimed in claim 1 wherein the sum of $a$ and $b$ is not more than 8 and $a$ is not greater than $b+3$.

11. A mixture as claimed in claim 1 in which in the prepolymer the group $R_1$ contains a cyclic group in the macromolecular chain of the prepolymer.

12. A mixture as claimed in claim 11 in which the group $R_1$ has a structure selected from

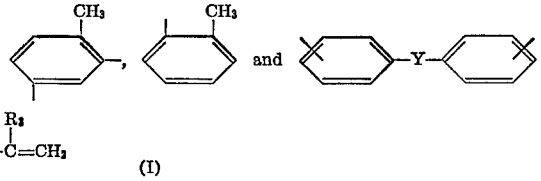

(I)

where Y is a divalent link selected from —SO$_2$—, —CH$_2$— and

13. A resin produced by copolymerisation of a mixture as claimed in claim 1.

References Cited
UNITED STATES PATENTS 3,297,745  1/1967  Fekete et al. _____ 260—77.5 AP
3,575,547  4/1971  Cordier et al. _____ 161—190

LEWIS T. JACOBS, Primary Examiner

U.S. Cl. X.R.

260—37 N, 41 A